United States Patent [19]

Lund et al.

[11] 4,320,462

[45] Mar. 16, 1982

[54] HIGH SPEED LASER PULSE ANALYZER

[75] Inventors: Roger E. Lund; Michael P. Wirick, both of Los Angeles, Calif.

[73] Assignee: Hughes Aircraft Company, Culver City, Calif.

[21] Appl. No.: 135,408

[22] Filed: Mar. 31, 1980

[51] Int. Cl.³ .......................................... G01N 21/00
[52] U.S. Cl. .................................. 364/525; 364/551; 356/73; 356/375
[58] Field of Search ............... 364/551, 525; 250/397; 356/73, 121, 375, 355, 356

[56] References Cited

U.S. PATENT DOCUMENTS

| | | | |
|---|---|---|---|
| 3,612,885 | 10/1971 | Arnaud | 356/121 X |
| 3,619,066 | 11/1971 | Kaiser et al. | 356/122 |
| 3,838,284 | 9/1974 | McIntyre et al. | 250/397 X |
| 3,861,801 | 1/1975 | Peters et al. | 356/121 |
| 3,879,128 | 4/1975 | Presby | 356/73 |
| 3,918,812 | 11/1975 | Holm | 356/73 |
| 4,037,959 | 7/1977 | Bumgardner | 356/73 |
| 4,045,140 | 8/1977 | Bumgardner | 356/375 X |
| 4,146,926 | 3/1979 | Clerget et al. | 356/375 X |
| 4,215,694 | 8/1980 | Isakov et al. | 356/375 X |
| 4,228,515 | 10/1980 | Genna et al. | 364/527 X |

OTHER PUBLICATIONS

Advanced Diffraction Pattern Analysis Algorithm, Charsky & Flamholz, IBM Technical Disclosure Bulletin, vol. 20, No. 1, Jun. 1977; pp. 206-214.

Primary Examiner—Edward J. Wise
Attorney, Agent, or Firm—Kenneth W. Float; William H. MacAllister

[57] ABSTRACT

Apparatus, including a detector array, analog-to-digital converter, a microprocessor including a memory, and display for determining the total energy, divergence and position of an applied laser beam from a single laser pulse. The detector array is coupled to the microprocessor and computer memory by way of the analog-to-digital converter. The microprocessor controls the detector array scanning and computes the values for the desired characteristics. The display provides for a numerical, alpha-numerical or printed record of the calculated values. A method of determining the total energy, relative position and divergence is also provided.

2 Claims, 4 Drawing Figures

|    | 10 | 11 | 12 | 13 | 14 | 15 | 16 | 17 | 18 | 19 | 20 | 21 |
|----|----|----|----|----|----|----|----|----|----|----|----|----|
| 10 |    |    |    |    |    |    |    |    | 36 |    |    |    |
| 11 |    |    | 53 |    |    |    |    |    |    |    |    |    |
| 12 |    |    |    |    |    |    | 78 |    |    |    |    |    |
| 13 |    |    |    |    |    |    |    |    |    |    |    |    |
| 14 |    |    |    |    |    |    |    |    |    |    |    |    |
| 15 | 56 |    |    |    |    | 91 | 94 |    |    |    |    |    |
| 16 |    |    |    |    | 103| 113| 110| 105|    |    | 85 |    |
| 17 |    |    |    |    | 95 | 97 | 102| 92 |    |    |    |    |
| 18 |    |    |    |    |    | 98 | 97 |    |    |    |    |    |
| 19 |    |    |    |    |    |    |    |    |    |    |    | 50 |
| 20 |    | 49 |    |    |    |    |    |    |    |    |    |    |
| 21 |    |    |    |    |    |    |    |    |    | 49 |    |    |

HIGH SPEED LASER PULSE ANALYZER

The present invention relates to laser beam measurement apparatus, and more particularly, to apparatus which measures the total energy, position and divergence of a laser beam sampled thereby.

BACKGROUND OF THE INVENTION

Current developments in laser systems, such as laser target designators, and the like, require calibration and routine maintenance tests and checks throughout the system life. Typical characteristics which are apt to be measured include total energy, beam alignment and beam divergence. There are no existing systems which can measure these characteristics inexpensively, quickly, and with a minimum of hardware.

For example, the divergence, defined as the size of the beam in which 90% of the beam energy is contained, was measured by employing a series of apertures of varying size. Numerous tests and many laser pulses were required to finally determine the divergence value. Energy distribution measurements were obtained utilizing transducers sequentially positioned at various places across the beam to obtain a one dimensional beam energy profile. An alternative system used a linear array of detectors to provide a one dimensional beam energy profile. In neither of these systems is the total beam energy monitored, nor is beam position information available without numerous tests.

SUMMARY OF THE INVENTION

Accordingly, it is an object of the present invention to provide a laser beam measuring system which requires only one laser pulse to determine the total energy, divergence and beam position thereof.

In accordance with this and other objects of the present invention, there is provided a high speed laser pulse analyser which includes a two-dimensional detector array onto which a laser beam is focused. The detector array is coupled to an analog-to-digital converter from which digital data is transferred to a computer memory of a microprocessor. The microprocessor is coupled to both the detector array to control element scanning and to the computer memory for retrieving and processing data. The microprocessor calculates the total energy, beam position and divergence of the laser beam applied to the detector array. A display is coupled to the microprocessor for displaying the calculated values. The analyzer requires only one laser pulse to impinge upon the detector array, and hence is very efficient and simple to operate. The system may also be configured as a portable unit for field testing and maintenance purposes. A method of determining the total energy, relative position and divergence of the laser beam is also provided.

BRIEF DESCRIPTION OF THE DRAWINGS

The foregoing and other objects and features of the present invention may be more readily understood with reference to the following detailed description taken in conjunction with the accompanying drawings, in which like reference numerals designate like structural elements, and in which.

DETAILED DESCRIPTION OF THE INVENTION

Figure 1:
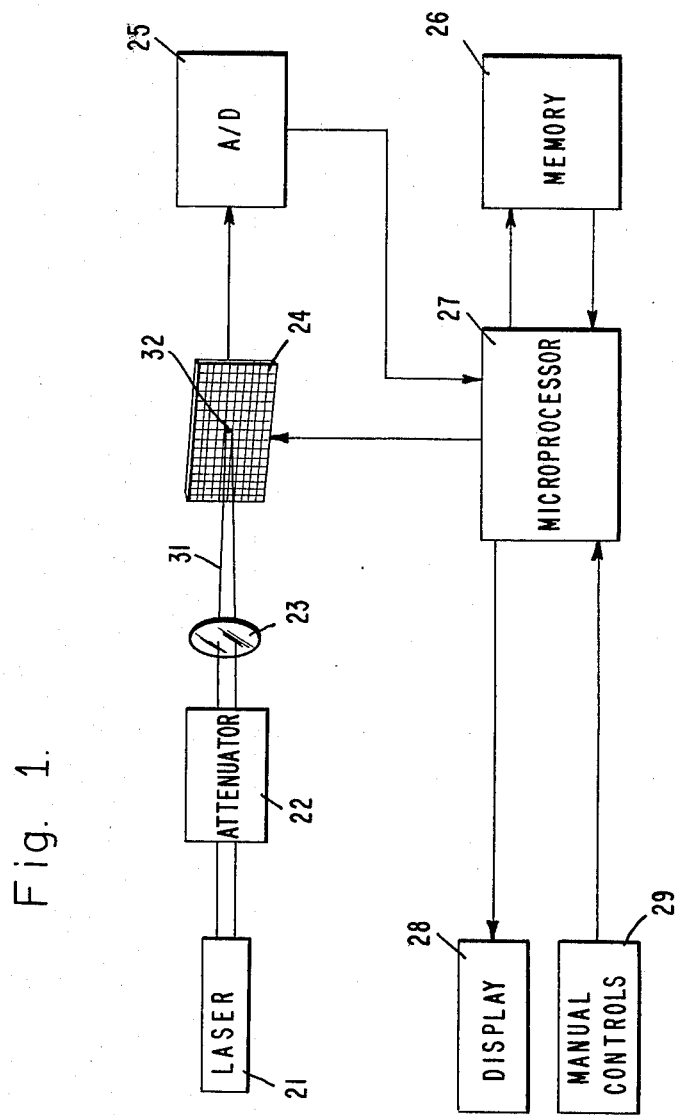
FIG. 1 illustrates high speed laser pulse analyzer in accordance with the principles of the present invention.

Referring to FIG. 1, the high speed laser pulse analyzer shown therein responds to a laser source 21 which constitutes the laser under test by the analyzer. The laser source 21 is aligned along an optical axis such that the laser beam 31 provided by the source 21 is oriented along the optical axis. An optical attenuator 22, such as a set of neutral density filters, or the like, may be disposed along the optical axis for reducing the laser power transmitted thereby such that the power level is compatible with other elements of the analyzer.

An optical system 23 is disposed along the optical axis for focusing the laser beam 31 transmitted by the laser source 21 and optical attenuator 22. The optical system 23 may be any conventional set of optics which is compatible with the optical wavelength of the laser source 21. A two-dimensional detector array 24 is disposed at the primary focal plane of the of the optical system 23. The detector array may be one having a thousand detector elements or so, such as a Reticon model RA-32X32A, or the like. This particular detector array is capable of responding to laser energy having a wavelength in the range from approximately 500 to 1020 nanometers. Accordingly, such lasers as Argon, GaAs, HeNe and YAG, or the like, may be tested by the analyzer.

The output of the detector array 24 is coupled to an analog-to-digital converter 25, such as Micronetwork model 5250, or the like. Circuitry is provided (not shown) as part of the analog-to-digital converter 25 for sampling and holding signals provided by the detector array 24 for a predetermined time period so that they may be digitized. The analog-to-digital converter 25 is coupled to a microprocessor 27, which includes a computer memory 26, such as an Intel model 2708, or the like. The computer memory 26 provides for storage of the digital data received from the analog-to-digital converter 25. The microprocessor 27, which may be a Motorola model 6800, or the like, is coupled to the detector array 24 for controlling the element scanning thereof, and is additionally coupled to the computer memory 26 for processing the data stored therein. The microprocessor 27 is also coupled to a display 28 which provides for numerical or alpha-numerical display, or numerical printout of the measured data provided by the microprocessor 27. Manual controls 29, coupled to the microprocessor 27, are provided to control the operation of the pulse analyzer in terms of detector scanning, computation and display functions.

In operation, the laser source 21 provides a beam 31, whose power level is attenuated by the optical attenuator 22 to be compatible with the power level required by the detector array 24, and which is focused by the optical system 23 onto the detector array 24. The laser beam 31 impinges upon the detector array 24 and makes a circular spot 32 thereon. The spot 32 is incident upon a plurality of detectors, each detector registering a particular voltage level in response to the laser light. The detector elements provide analog signals proportional to the power of the laster beam 31 incident thereupon. The analog signals are transferred to sample and hold circuitry which holds the voltage levels for a period of time sufficient to allow the analog-to-digital converter 25 to digitize the signals.

The microprocessor 27 controls the scanning of the detector array 24 and thus provides a sequential series of analog output signals to the analog-to-digital converter 25. The scanning may be repetitive or may be triggered by the detection of the laser beam 31 by the detector array 24. These signals are digitized and stored in the computer memory 26. Once the data is stored, the microprocessor 27 retrieves the data from storage and calculates appropriate values for the total energy, divergence and beam position therefrom. This information is then displayed by the display 28 on command from the operator through use of the manual controls 29. The desired data may be measured using only one laser pulse applied to the detector array 24, and as such, the pulse analyzer is fast and efficient.

For example, on command from the manual controls 29, the microprocessor 27 starts scanning the detector array 24, and the data received therefrom is put into a portion of the memory 26. The preliminary scans provide for a measure of the background noise level measured by the detector array 24. Once a laser pulse is detected the new data therefrom is stored in a second portion of the memory 26 and the calculation of the total energy is automatically commenced. The total energy ($P_T$) may be calculated from the equation $$P_T = \sum_{i=1}^{n} P_i,$$

where $P_i$ is the energy in any particular detector element and the summation is over all detector elements, with n=1024 being a representative number of detector elements in the detector array 24.

The boresight, or relative position calculation may be made by computing energy moments about a set of orthogonal axes to determine the center, or centroid, of the laser beam 31. This calculation is analogous to calculations performed to determine the center of mass or gravity of an object. For example, the location of the center of mass of a two-dimensional object may be determined from the equation:

$$c.m. = \bar{x}, \bar{y} = \frac{\sum_i x_i m_i}{\sum_i m_i}, \frac{\sum_i y_i m_i}{\sum_i m_i},$$

where $\bar{x}$ and $\bar{y}$ are the x and y coordinates of the center of mass, and $x_i$ and $y_i$ are the lengths of moment arms to any particular infinitesimal mass element, $m_i$, measured from a particular set of reference axes. This computation is well-known to those in physics or engineering disciplines. The calculated boresight may be compared with the known center of the detector array 24, and the laser beam 31 may be adjusted to have its center located at that position, if desired.

The divergence caculation computes the diameter of the laser beam 31 in which 90% of the energy is contained. The beam profile of the laser beam 31 is generally Gaussian in shape with the power level tapering off exponentially near the outer edges of the beam 31. Measurement of the beam diameter containing 90% of the total energy provides a measurement standard for comparing laser beam profiles. The divergence may also be represented as an angular deviation of the laser beam 31 (in milliradians) from being collimated. This is also termed "spreading" of the laser beam 31. The angular deviation is given by the ratio of the beam diameter to the distance between the laser source 21 and the detector array 24, in milliradians.

The divergence may be determined using the detector element of the previously determined beam center as a starting point and summing the stored signals associated with the elements of the detector array 24 in a predetermined manner. The microprocessor 27 sums sets of detector elements which approximate circles of varying diameter until the 90% energy value is reached. Once the 90% energy value is reached, the corresponding beam diameter is provided to the display 28 on command from the manual controls 29.

Figures 2, 3:
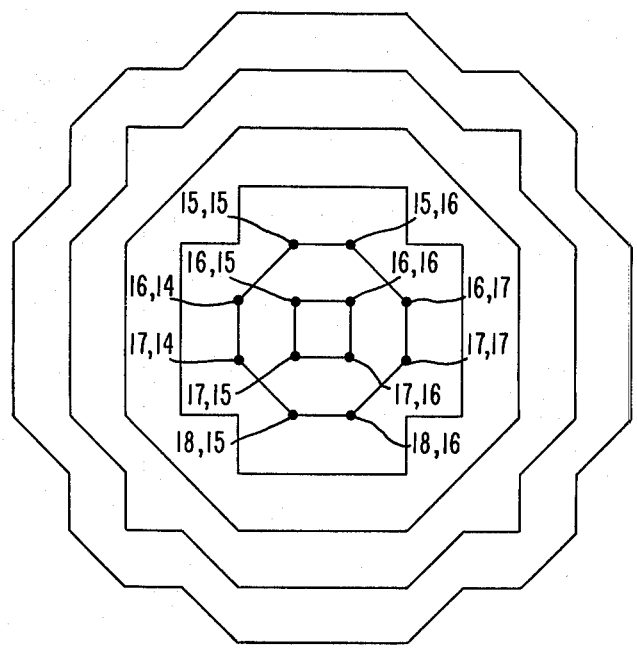
FIG. 2 illustrates detector patterns which are summed when determining the beam divergence.
FIG. 3 illustrates a matrix of detector signal outputs for a typical system test.

Referring to FIG. 2, there is shown an illustration of six "circles" which interconnect centers of detector elements of the detector array 24, and which are employed in the divergence calculation. The "circles" are not round, but closely approximate circles of increasing diameters with respect to the detector elements intersected thereby. The centers of 12 elements are identified by matrix notation whose outputs are summed for the two smallest "circles". The divergence calculation sums the signals from detector elements which intersect the smallest "circle", and compare that value with a value which is 90% of the total energy. If this figure is less than the 90% figure, signals from elements intersecting the next "circle" are added and compared, and so on until the 90% figure is obtained. Once obtained, a corresponding diameter is indicated and stored for later display.

For example, and referring to FIG. 3, the matrix shown has typical detector element signal values indicated therein which represents typical test results using a HeNe laser. The numbers are arbitrary and not indicative of energy in engineering units. The square box in the middle containing the numbered squares correspond to detector elements which are summed during the first two divergence calculations as indicated in FIG. 2. The divergence computation would proceed as follows:

The boresight, or centroid of the laser beam 31 is approximately at the center of the detectors having signal values of 113, 110, 97 and 102 therein, or in matrix terms, the detectors located at (15, 16), (16, 16) (15, 17), and (16, 17). These four values are summed, yielding a value of 422. This value is compared against the 90% total energy figure. If it is less, the detector elements which are determined by the second "circle", or octagonal trace on FIG. 2, are summed and added to the first value, 422. The second "circle" includes eight detector elements located at (15, 15), (15, 16), (16, 14), (16, 17), (17, 14), (17, 17), (18, 15) and (18, 16). The signal values are 91, 94, 103, 105, 95, 92, 98 and 97, which sum to a value of 863. This value is summed with 422 and is again compared with the 90% energy figure, and so on until the 90% energy figure is reached or exceeded. Once this occurs, a representative laser beam diameter is stored and provided to the display 28 on command from the manual controls 29.

An alternative way of determining the boresight, or relative position of the center of the laser beam 31 is to first assume a particular divergence diameter which includes a known number of detector elements. The detector array 24 is then searched using groups of detector elements which represent the beam divergence area until a maximum signal strength is determined. Accordingly, the boresight is that point at the center of the divergence circle which exhibits the maximum signal strength. Once this boresight is determined, the actual divergence may be calculated in the manner as described hereinabove.

Figure 4:
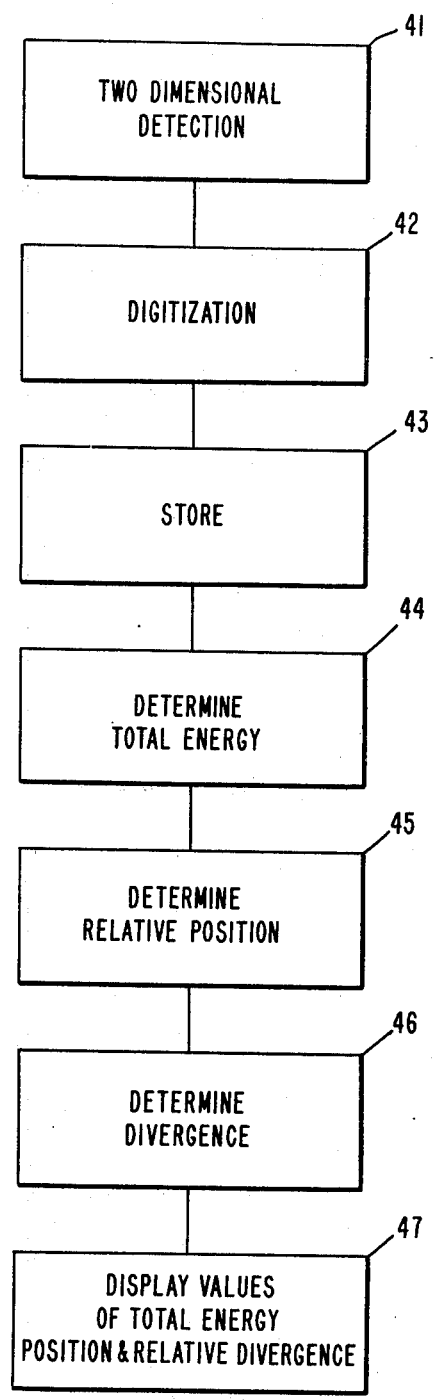
FIG. 4 illustrates the steps required to determine the total energy, relative position and divergence in accordance with the present invention.

Referring now to FIG. 4, a flow diagram illustrating the method of determining the total energy, relative position and divergence of a laser beam is shown. The steps include: detecting the energy from a laser beam by means of a two dimensional detector array as indicated in step 41; digitizing the signals provided by the detector array in step 42; and storing the digitized signals in step 43. Step 44 provides for determining the total energy in the laser beam by summing the signals provided by the detector array and applying the requisite multiplicative factors to yield energy in terms of engineering units. Step 45 provides for determining the relative position of laser beam center, or the centroid thereof, while step 46 provides for determining the divergence of the laser beam referenced from the beam center, calculated in step 45. Step 47 provides for displaying the values of total energy, beam position and divergence.

An improvement in the dynamic range of the analyzer may be obtained by application of individual correction factors to each detector element output implemented by the microprocessor 27. This is accomplished by sampling the elements of the detector array 24 prior to the illumination thereof by the laser pulse. This provides values of random background and detector element noise, generally considered the dark current. Once a laser pulse is detected, the background noise may be subtracted from each detector element signal to provide for more accurate energy, boresight and divergence determinations. Variations in gain and leakage between detector elements may thus be eliminated by use of this corrective measure.

Thus, there has been described an apparatus which provides for fast and efficient measurement of certain laser beam parameters including total energy, divergence and beam position.

It is to be understood that the above-described embodiment is merely illustrative but a small number of the many possible specific embodiments which represent applications of the principles of the present invention. Numerous and varied other arrangements may readily be devised in accordance with these principles by those skilled in the art without departing from the spirit and scope of the invention.

What is claimed is:

1. A laser system analyzer for determining from a single laser pulse, the total energy, relative position and divergence of a laser beam made incident thereupon, said apparatus comprising:
    a two-dimensional array of detector elements for detecting laser energy received by respective detector elements from a single laser pulse and providing signals indicative of said laser energy;
    first means coupled to said detector array for digitizing the signals provided thereby;
    microprocessor means, including a digital memory, for scanning said detector array in a predetermined manner and storing digitized signals received thereby, and for processing said digitized signals so as to provide values of the total energy, relative position and divergence of said laser pulse; and
    means for displaying the values determined by said microprocessor means.

2. A method of determining the total energy, relative position and divergence of the laser beam requiring a single laser pulse, said method comprising the steps of:
    detecting a single laser pulse by means of a two dimensional detector array;
    digitizing signals provided by said two dimensional detector array;
    storing said digitized signals in a memory;
    determining the total energy of said laser pulse in a first predetermined manner from said stored digitized signals;
    determining the relative position of said laser pulse in a second predetermined manner from said stored digitized signals;
    determining the divergence of said laser pulse in a third predetermined manner from said stored digitized signals and with reference to the relative position of said laser pulse; and
    displaying the values of the total energy, relative position and divergence of said laser beam.

* * * * *